Jan. 19, 1971  D. R. REITERMAN  3,555,610

GASKET RING

Original Filed Feb. 19, 1968

DONALD R. REITERMAN
INVENTOR.

BY

ATTORNEYS

United States Patent Office 3,555,610
Patented Jan. 19, 1971

3,555,610
GASKET RING
Donald R. Reiterman, Sierra Madre, Calif., assignor to Armorlite Lens Company, Inc., Burbank, Calif., a corporation of California
Original application Feb. 19, 1968, Ser. No. 706,717. Divided and this application Dec. 15, 1969, Ser. No. 885,054
Int. Cl. B24c 5/00; B29d 11/00
U.S. Cl. 18—34          6 Claims

ABSTRACT OF THE DISCLOSURE

A gasket ring of resilient elastomeric material for use with upper and lower mold members to cast plastic optical elements. The gasket is contoured to embrace and seat over an annular support carried by the lower mold member with the lower edge of its inner side wall seated against and having line contact with the upper edge of the annular support. The upper edge of the gasket is shaped to have line contact with the lower surface of the upper mold member.

---

This application is a division of my copending application for United States Letters Patent Ser. No. 706,717, filed Feb. 19, 1968 entitled Gasket for Molding plastic Optical Elements.

This invention relates to an improved mold assembly for molding plastic optical elements and features an improved elastomeric gasket for holding the mold members in vertically spaced relation and to an improved mode of supporting this gasket outwardly of but closely adjacent the rim edge of the optical surface of the lower mold member.

Molding optical elements with optically finished surfaces free of distortions and imperfections present numerous vexatious problems. Desirably, the two mold members are separated from one another by a peripheral resilient gasket member which adheres to the casting sufficiently to prevent premature separation of the casting from the mold components during cure. Additionally, it is of critical importance to maintain a fluid-tight seal at the periphery of the mold cavity at the junction of the gasket with the lower mold member. At least the upper seal must permit the escape of any excess quantity of the charge and the lower seal must safeguard against leakage of the charge as curing proceeds. It is also highly desirable that suitable means be provided for accurately centering the upper mold member concentrically of the lower mold member without introducing restraints interfering with movement of the members to accommodate shrinkage of the charge during curing.

Other problems associated with the molding of plastic elements involve the protection of the rigid lower mold member from damage during handling. This member customarily is made of glass and its precision upper surface is provided with an optical finish. Since this member is normally reused many times, it is subject to frequent handling during assembly, disassembly, cleaning, inspection and other operations. Accordingly, the optical surface can be irreparably injured, as by chipping, and most likely to occur adjacent its rim edge.

It is, therefore, the purpose of the present invention to provide a mold assembly or device avoiding the foregoing and other disadvantages and shortcomings of the prior art. To this end, the lower mold member has firmly secured to its peripheral edge a thick-walled ring of rigid material having an accurately finished planar upper end. An elastomeric gasket ring especially designed for use with this mold member features an inwardly opening annular groove formed with a lip at its upper inner edge so shaped and disposed as to have continuous line contact with the upper end of this ring outwardly of but close to the rim of the optical surface. The flange or bead forming the lower side wall of the gasket groove preferably has a press fit over the lower end of the rigid ring and serves to hold the gasket snugly assembled to the rigid ring of the mold member with the aforementioned sealing lip pressed in firm resilient sealing contact with the upper end of this ring. The upper half of the gasket side wall has an axial height corresponding generally with the rim thickness of the mold cavity and the upper end of the gasket is beveled in such manner that the upper inner rim of the gasket ring has continuous line contact with the underside of the upper mold member. Castings having either toric or spherical surfaces can be cast using the mold components embodying the principles of this invention.

Another feature of the gasket is the provision of bosses distributed about the periphery of its upper edge outwardly of its sealing lip and having radial contact with the peripheral edge of the upper mold member to hold it accurately aligned with the lower mold member.

It is therefore a primary object of the invention to provide an improved mold device for use in molding plastic optical elements.

Another object of the invention is the provision of a molding device utilizing a resilient gasket ring for holding the mold members accurately spaced including improved means for providing continuous line contact between the gasket ring and the mold members at the upper and lower peripheral edges of an optical element undergoing molding therebetween.

Another object of the invention is the provision of an improved flexible gasket for use in holding a pair of mold members accurately spaced and cooperating therewith to form a fluid-tight mold cavity during curing while permitting any excess charge to escape by overflow and drain fully away from the mold assembly.

Another object of the invention is the provision of an improved elastomeric gasket for molding plastic optical elements and adapted to be assembled about a rigid ring secured to a mold member therefor and having an endless lip in resilient sealing contact with the rigid ring.

Another object of the invention is the provision of a mold member for use in molding plastic optical elements and featuring a rigid ring secured to its periphery and having a smooth end surface flush with the adjacent rim edge of the molding surface of the mold member.

Another object of the invention is the provision of a mold device utilizing a toric mold member provided with a rigid ring about its periphery and having its upper end located below the toric mold cavity surface and including a cooperating resilient gasket ring embracing the rigid ring with its interior side wall stressed to lie in sealing contact with that portion of the periphery of the mold member projecting above the upper end of the rigid ring.

These and other more specific objects will appear upon reading the following specification and claims and upon considering in connection therewith the attached drawing to which they relate.

Referring now to the drawing in which a preferred embodiment of the invention is illustrated:

Figure 1:
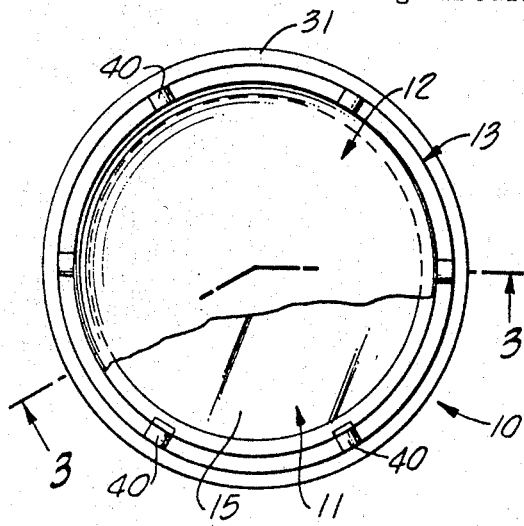
FIG. 1 is a top plan view with parts broken away of one preferred embodiment of the assembled molding device designed for use in molding a toric optical element.
Figure 2:
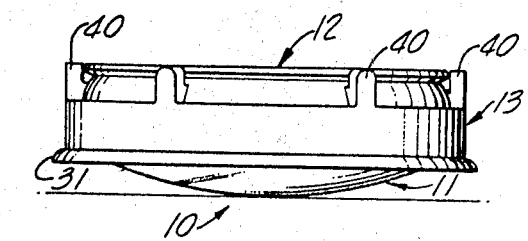
FIG. 2 is a side elevational view of the molding device.
Figure 3:
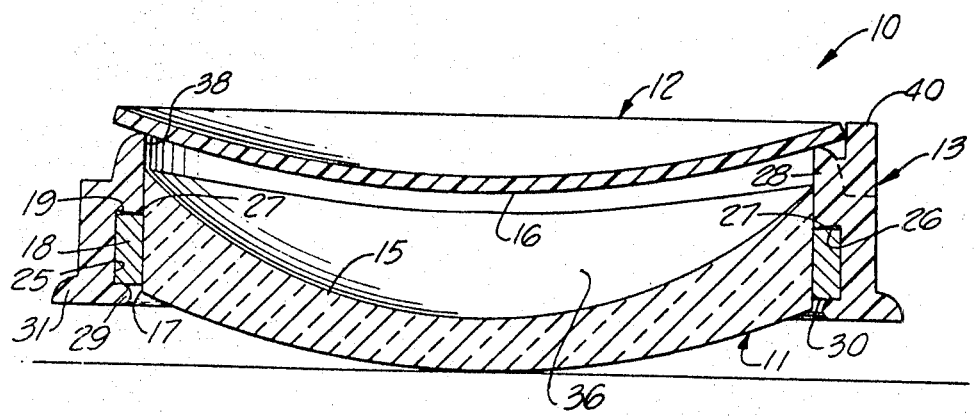
FIG. 3 is a cross-sectional view on an enlarged scale taken along the broken lines 3—3 on FIG. 1.

Referring initially more particularly to FIGS. 1, 2 and 3, there is shown an assembled molding device, designated generally 10, and embodying the principles of this invention. The invention mold device or assembly includes a rigid lower mold member 11 of relatively thick glass and an upper mold member 12 of any suitable material having either flexible or non-flexible characteristics, and an intervening flexible elastomeric gasket ring 13. The upper surface 15 of mold member 11 is provided with a precision optical finish of a desired toric contour extending from rim to rim thereof. An optical finish 16 is provided on the downwardly facing lower surface of upper mold member 12, it being noted that the diameter of the upper mold member 12 is substantially greater than the optically finished surface 15 of the lower member 11. As herein shown, upper mold member 12, as herein illustrated, is relatively thin and flexible, as is desirable if the center portion of the mold cavity 36 is of different thickness than the peripheral portions of the cavity. However, it will be understood that the upper mold member may be relatively thick and non-flexible where shrinkage during curing is small or presents no separation problems.

Closely embracing rim 17 of mold member 11 is a relatively thick-walled rigid reinforcing ring 18. The upper rim end 19 of ring 18 lies in a diametric plane spaced axially below the lowest portion of the rim edge of toric optical surface 15. Ring 18 is held firmly assembled to rim 17 by a bonding agent. As here shown, reinforcing ring 18 is formed of suitable metal but it will be understood that it may consist of suitable rigid non-metallic material such as a strong tough plastic material immune to the ingredients of the composition being cast.

Gasket ring 13 forming an important feature of the invention is molded in one piece from a suitable thermoplastic material, its major portions preferably being substantially of the same thickness. The lower end half of the ring is formed with an inwardly opening groove 25 adapted to receive and have a firm seating engagement with the reinforcing ring 18. The upper side wall 26 of groove 25 is inclined acutely to end surface 19 of rigid ring 18 thereby providing a sharp-edged sealing lip 27 at the merger of the groove side wall with the overlying interior side wall 28 of the gasket ring. Side wall 28 preferably has a circumference slightly less than juxtaposed surface of mold member 11. In consequence, gasket surface 28 snugly embraces and seals against the portion of the mold member periphery projecting above ring end 19. In some cases it is preferable that lip 27 seal against ring 18 slightly outwardly of the inner rim edge of this ring. Lip 27 is also held lightly but firmly pressed against end surface 19 of ring 18 by the annular bead 29, it being understood that bead 29 is so designed that it must be press-assembled against the lower end 30 of ring 18. Projecting outwardly from the gasket opposite bead 29 is an annular flange 31 which increases the effectiveness of bead 29 and facilitates assembly and disassembly of the gasket from mold member 11.

The upper end of the gasket ring is beveled along the contour clearly shown in FIG. 3 and its upper inner edge provides a sealing lip 38 having continuous line contact with the optical surface 16 of the upper mold member. As best appears from FIG. 4, the beveled upper end surface of the gasket ring provides a sealing lip 38 having line contact with upper mold member 12 while permitting excess portions of the charge to drain away from beneath the upper mold member as it settles into seating and sealing engagement with sealing lip 38 following the charging operation.

Figure 4:
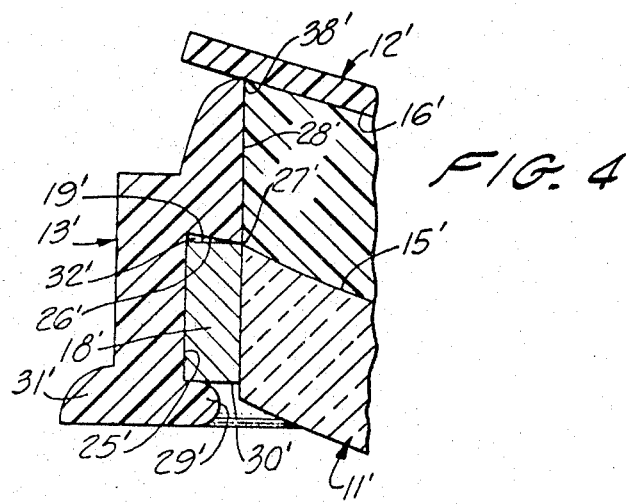
FIG. 4 is a fragmentary cross-sectional view on an enlarged scale through the molding device charged with plastic and designed for use in casting spherical optical elements.

The second illustrative embodiment shown in FIG. 4 differs in only minor respects from that described above in connection with FIGS. 1 to 3 and the same or analogous features are designated by the same reference characters distinguished by the addition of a prime. The principal difference is that lower mold member 11' is formed with a spherical optical surface 15' having its rim edge flush with the upper end 19 of bumper ring 18. Sealing lip 27' seals against the inner edge of end 19 immediately adjacent the merger of the latter with the edge of mold surface 15'.

The mode of use of the described mold devices will be quite evident from the foregoing detailed description of two typical embodiments. Prior to assembly of the gasket ring to the lower mold member, the latter is thoroughly cleaned and checked for the presence of any imperfections in its optical surface or the presence of any foreign matter on that surface or on any exposed surface of reinforcing ring 18. The mold member can be handled safely and without risk of chipping or injuring its optical surface because of the protection afforded by bumper ring 18 and the convenience provided by the latter in handling and gripping the mold member. A gasket ring 13 selected for use in a particular molding operation is similarly cleaned, inspected and then assembled about ring 18. As the lower wall or bead 29 of the gasket is pressed over the lower end of the ring 18, sealing lip 27 is lightly preloaded against the upper end of the ring thereby safeguarding against the possibility of a portion of the charge escaping from the mold cavity between the exterior of ring 18 and the surface of groove 25. If a toric lower mold member 11 is being used surface 28 of the gasket has a snug fit with the adjacent periphery of the mold member and cooperates with lip 27 in providing a highly effective seal.

After the upper mold member 12 has been carefully cleaned and inspected, it is lowered against sealing lip 38 of the gasket, the accurate position of the mold member being assured by a plurality of positioning bosses or locators 40 or 40' integral with gasket ring 13 and distributed about the upper outer rim of the ring as is made clear in FIGS. 1, 2 and 3. The spacing between bosses 40 is ample to receive the tips of the operator's fingers while gripping the peripheral rim of mold member 12. The assembled mold device is maintained closed until ready for charging to prevent the possibility of foreign matter entering the cavity or collecting on any of the cavity surfaces.

To charge the mold, the user grabs the rim of mold member 12 between his fingers and tilts one edge upwardly sufficiently to receive a charging nozzle. A charge of plastic, preferably prethickened close to the gel point, is then introduced along with sufficient excess to assure complete filling of cavity 36. As the charging nozzle is withdrawn mold member 12 is lowered gently against the upper lip 38 of the gasket as excess portions of the charge escape past the lip and overflow. It is found that if the mold is charged with prethickened resin and then placed in an oven at say 100° F., the charge expands thermally and gels without shrinking sufficiently to draw in a bubble of air. In this manner void-free castings are produced with consistency.

The charged mold device is then subjected to curing in an oven in a manner well known to those skilled in this art. Differential shrinkage of the cavity charge occurs in those cases where the center portion of the cavity is of different thickness than the rim portions and is accommodated by the gasket ring 13 and by flexure of member 12. However, such flexure does not result in disrupting the seal of either of the sealing lips 27 or 38. Additionally and importantly, the thin flexible nature of lips 27 and 38 as well as the upper half of the gasket ring as a whole readily accommodates shrinkage of the plastic charge without introducing stresses or strain in the charge of distortions in the surfaces in contact with either of the optical surfaces 15 and 16.

Following curing of the charge the finished optical element 42 is removed from the mold device in the usual manner. Normally gasket ring 13 is peeled away first following which the upper mold member 12 is detached.

Thereafter, the optical element 42 is separated from lower member 11.

While the particular gasket ring herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A resilient one-piece gasket ring for use with its axis in an upright position to hold a pair of mold members in vertically spaced apart relation and cooperating therewith to form a fluid-tight cavity for molding a plastic optical element, said gasket ring being molded from elastomeric material and having a radially shallow groove having axially spaced sidewalls opening inwardly through the inner side wall of the lower half of said gasket ring intermediate the opposite axial ends thereof, the inner upper side wall surface of said gasket ring having a height corresponding generally with the peripheral rim thickness of a mold cavity, the upper end of said gasket and the upper radial side wall of said groove converging outwardly and toward one another, and the upper and lower radial side walls of said shallow groove being adapted to snugly embrace the upper and lower surfaces of the peripheral portion of a lower mold member thereby to hold the upper inner rim edge of said shallow groove slightly preloaded in resilient line sealing contact with an upwardly facing reference surface of a lower mold member when said gasket ring is assembled thereto.

2. A resilient one-piece gasket ring for use with its axis in an upright position to hold a pair of mold members in vertically spaced apart relation and cooperating therewith to form a fluid tight cavity for molding a plastic optical element having at least one optically finished surface, said gasket ring having an upright tubular upper section adapted to define the outer side wall of a mold cavity, the lower section of said gasket being of greater diameter and having a radially shallow groove having upper and lower sidewalls opening inwardly at a level spaced axially below said optically finished surface and having a width sized to embrace the peripheral edge of a lower mold member snugly and with the inner upper edge of the groove side wall in resilient line contact with the upwardly facing seating rim of a lower mold member, and the upper rim end of said gasket ring sloping outwardly and downwardly to provide an inner upper lip edge adapted to have continuous line sealing contact with the lower surface of an upper mold member when supported thereagainst.

3. A gasket ring as defined in claim 2 characterized in having a plurality of low height bosses projecting upwardly from and distributed about the upper outer rim of said gasket ring with their inner surfaces positioned to engage the peripheral rim of an upper mold member when the latter is seated on the upper inner edge of said gasket ring, and the portion of the upper rim end of said gasket ring between said bosses being unobstructed and permitting overflow portions of the charge to escape without clinging to the underside rim portion of the upper mold member.

4. A resilient one-piece gasket ring for use in supporting a pair of mold members in a desired vertically spaced apart relation to provide a fluid-tight cavity for molding a plastic optical element, said gasket ring having a flexible resilient main body sized to snugly embrace the periphery of a lower mold member, the upper end of said gasket ring having a plurality of bosses projecting upwardly from the outer portion thereof and adapted to cooperate with one another to engage the rim edge of an upper mold member and hold the same accurately centered between said bosses when resting against the upper rim edge of an upper mold member.

5. A gasket ring as defined in claim 4 characterized in that the outer upper rim portion of said gasket ring is relieved between said bosses to provide room for an operator's fingers to engage the peripheral edge of an upper mold member while manipulating the same in casting an optical element using said gasket ring.

6. A gasket ring as defined in claim 4 characterized in that the upper rim edge of said gasket ring is formed to provide a resilient sealing lip at the inner rim edge thereof adapted to have line contact with an upper mold member.

References Cited

UNITED STATES PATENTS

| | | |
|---|---|---|
| 3,056,166 | 10/1962 | Weinberg. |
| 3,222,432 | 12/1965 | Grandperret. |
| 3,273,204 | 9/1966 | Craddock. |
| 3,353,220 | 11/1967 | Lenoble. |
| 3,460,928 | 8/1969 | Casko. |
| 3,331,102 | 7/1967 | Mignen. |

J. HOWARD FLINT, JR., Primary Examiner

U.S. Cl. X.R.

18—lens mold dig.